United States Patent
Kim

(10) Patent No.: US 6,929,315 B2
(45) Date of Patent: Aug. 16, 2005

(54) REAR FLOOR PART STRUCTURE FOR VEHICLE

(75) Inventor: Ki-Chang Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/750,680

(22) Filed: Dec. 31, 2003

(65) Prior Publication Data

US 2004/0232730 A1 Nov. 25, 2004

(30) Foreign Application Priority Data

May 21, 2003 (KR) .............................. 10-2003-0032223

(51) Int. Cl.[7] .............................................. B62D 25/20
(52) U.S. Cl. ...................................... 296/204; 396/37.2
(58) Field of Search ..................... 296/30, 204, 203.04, 296/37.2, 187.11, 188, 189

(56) References Cited

U.S. PATENT DOCUMENTS

| | | | |
|---|---|---|---|
| 4,533,169 A | * 8/1985 | Rauthmann et al. | ....... 296/37.2 |
| 5,419,609 A | * 5/1995 | Kmiec et al. | .......... 296/187.11 |
| 5,567,005 A | * 10/1996 | Kosuge et al. | .............. 296/204 |
| 5,803,533 A | * 9/1998 | Schulz et al. | ................ 296/204 |
| 5,829,824 A | * 11/1998 | Yamamuro et al. | ......... 296/204 |
| 2002/0043814 A1 | * 4/2002 | Weiman | ...................... 296/29 |

FOREIGN PATENT DOCUMENTS

| | | | | |
|---|---|---|---|---|
| JP | 404050083 | * | 2/1992 | ................. 296/189 |
| JP | 08-108868 | | 4/1996 | |
| JP | 2003-000859 | | 1/2003 | |

* cited by examiner

Primary Examiner—Dennis H. Pedder
(74) Attorney, Agent, or Firm—Morgan Lewis & Bockius LLP

(57) ABSTRACT

The rear floor part structure for a vehicle includes a rear support bracket disposed between a spare-tire compartment and a rear floor cross member, a cross member bracket mounted at a coupling part of the rear floor cross member and rear floor side member by welding, and a pair of side member brackets disposed to face each other and inserted by being welded inside the rear floor side member near the part where the rear floor cross member couples with the rear floor side member is disclosed. The structure constructed above is configured to reinforce the rigidity of the vehicle body, thereby limiting the amount of thrust placed on the rear floor part toward the front of the vehicle when a rear collision occurs.

4 Claims, 4 Drawing Sheets

REAR FLOOR PART STRUCTURE FOR VEHICLE

CROSS-REFERENCE TO RELATED APPLICATIONS

This application claims priority to Korean Patent Application No. 10-2003-0032223, filed on May 21, 2003, which is incorporated fully herein by reference.

FIELD OF THE INVENTION

The present invention relates to a rear floor part structure for a vehicle, which is adapted to reinforce the rigidity of the vehicle in case of a rear collision.

BACKGROUND OF THE INVENTION

In the event of a rear collision, the impact is likely to cause the vehicle body to thrust toward the front of the vehicle, cause fuel leakage from the damage to the fuel tank, and induce injury to the passengers riding in the rear seats.

Accordingly, it is important to obtain sufficient rigidity in the rear part of the vehicle in case of a rear impact collision.

SUMMARY OF THE INVENTION

Embodiments of the present invention provide a rear floor part structure for a vehicle, which is adapted to increase the supporting rigidity of a spare-tire compartment in relation to the direction of the impact and to strengthen the coupling rigidity of the coupling part of the rear floor side member and rear floor cross member, thereby minimizing the amount of thrust placed on the rear floor part toward the front of the vehicle, preventing damage to the fuel tank, and effectively protecting the rear seat passengers' safety.

In a preferred embodiment of the present invention, the rear floor part structure for a vehicle comprises a rear support bracket disposed between a rear floor panel part that forms a spare-tire compartment and a rear floor cross member that connects the spare-tire compartment and the rear floor cross member. A cross member bracket is mounted at the coupling part of the rear floor cross member and rear floor side member, so that it increases the rigidity of the coupling part therein. A pair of side member brackets, which are disposed to face each other, are inserted by being welded inside the rear floor side member near the part where the rear floor cross member couples with the rear floor side member.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

The preferred embodiment of the present invention will now be described in detail with reference to the accompanying drawings.

The embodiment of the present invention is configured to increase the rigidity of the rear floor part that forms the trunk, thereby limiting the maximum amount of thrust placed on the rear floor part toward the front of the vehicle during a rear collision.

Figure 1:
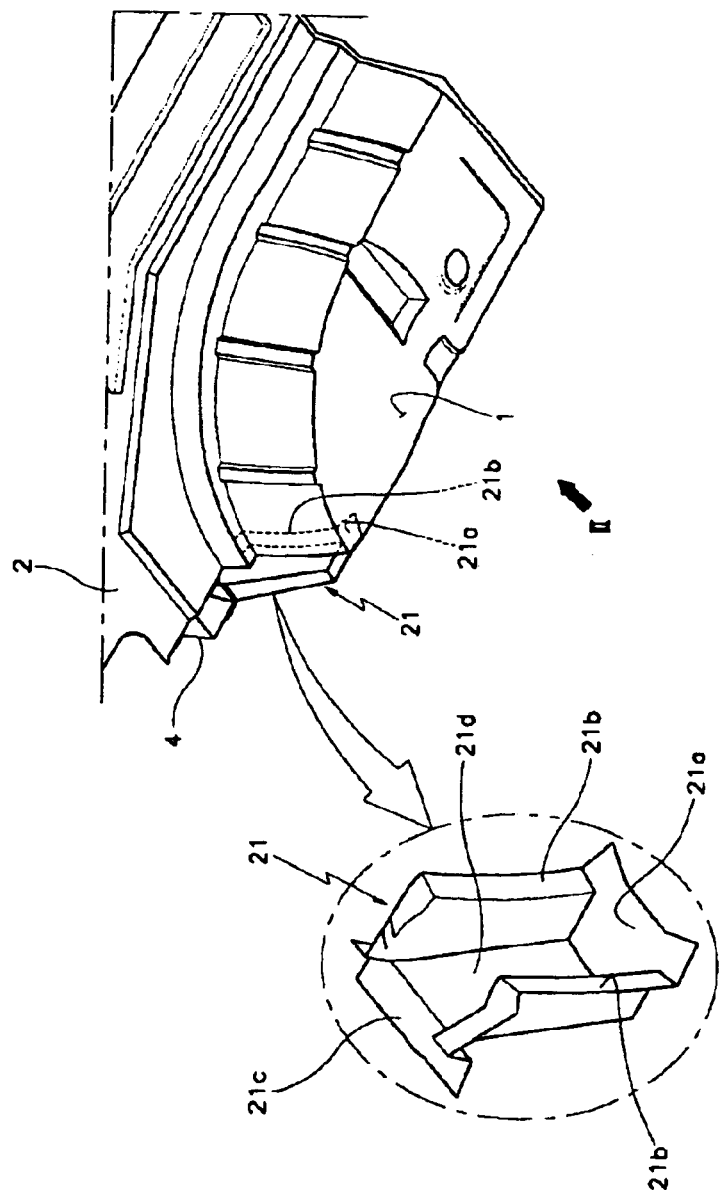
FIG. 1 is a perspective view illustrating the rear floor part structure of a vehicle according to an embodiment of the present invention.
Figure 2:
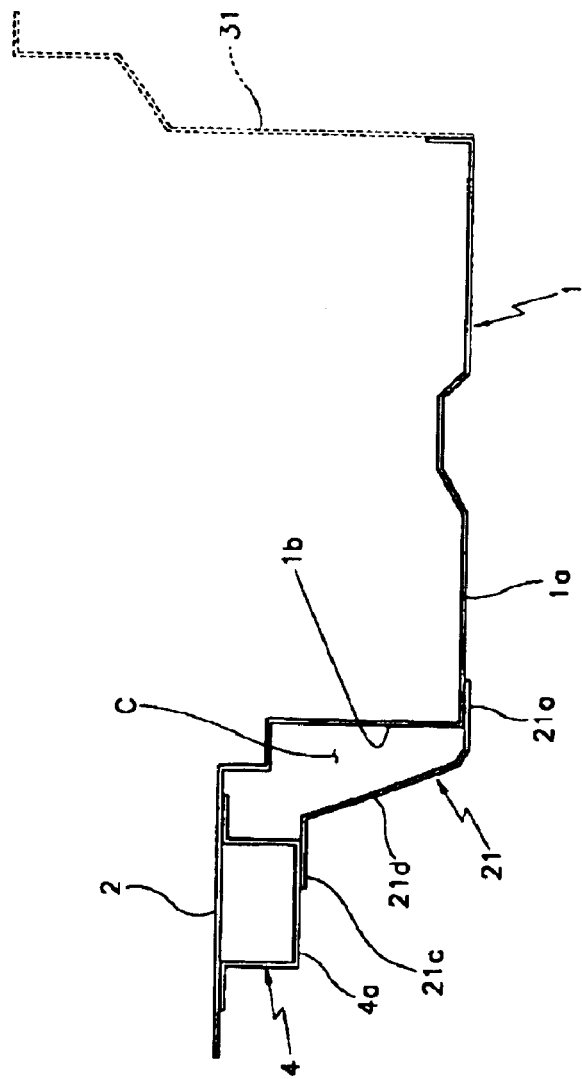
FIG. 2 illustrates a cross-sectional view of a rear floor part for a vehicle in a longitudinal direction of the vehicle when observed from the II direction of FIG. 1.

As shown in FIGS. 1 and 2, the rear floor part structure for a vehicle comprises a rear floor panel 2 having a spare-tire compartment 1 at the rear of the vehicle. A pair of rear floor side members 3 are disposed, such that each rear floor side member is under both sides of the rear floor panel 2 in a longitudinal direction of the vehicle and being welded onto the bottom side of the rear floor panel 2. A rear floor cross member 4 is distantly placed from the spare-tire compartment 1 and placed toward the front of the vehicle, and traverses the rear floor panel 2 along the width of the vehicle, wherein both ends of the rear floor cross member 4 connect with each rear floor side member 3 by being welded together. A rear side panel encloses the rear part of the spare-tire compartment 1.

Figure 3:
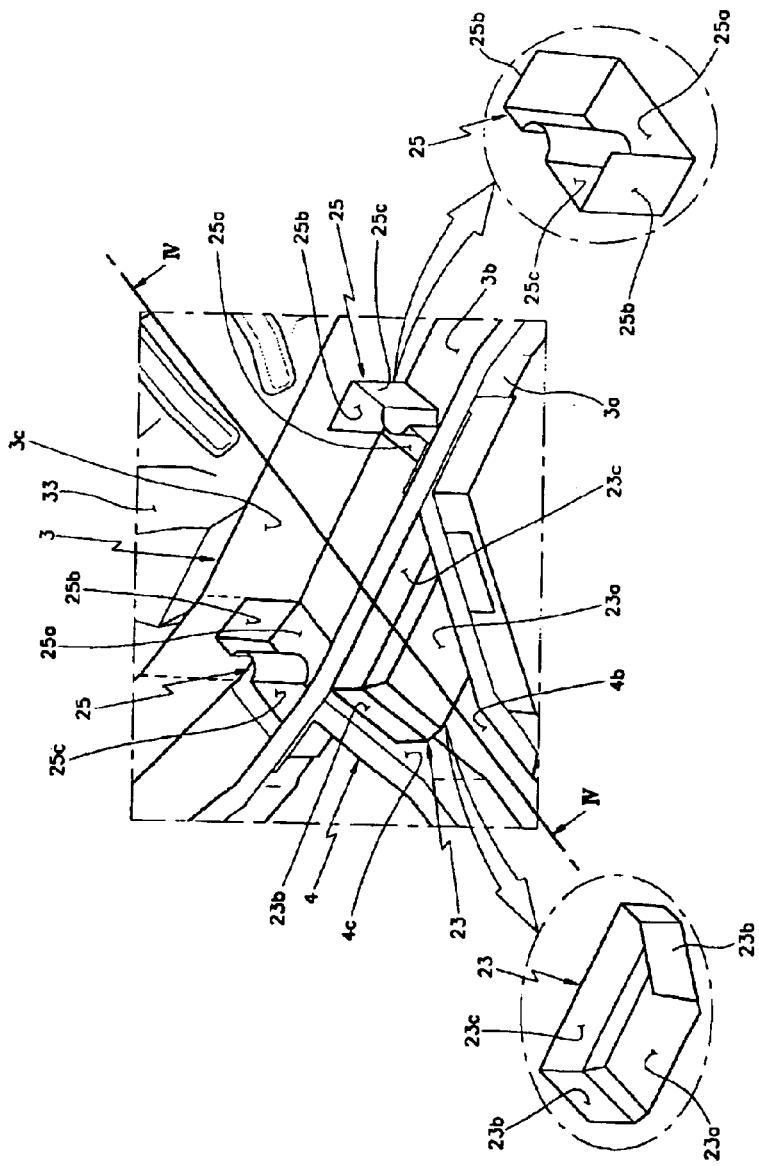
FIG. 3 illustrates a perspective view of the rear floor part structure of a vehicle according to an embodiment of the present invention, showing the coupling part of the rear floor cross member and the rear floor side member.
Figure 4:
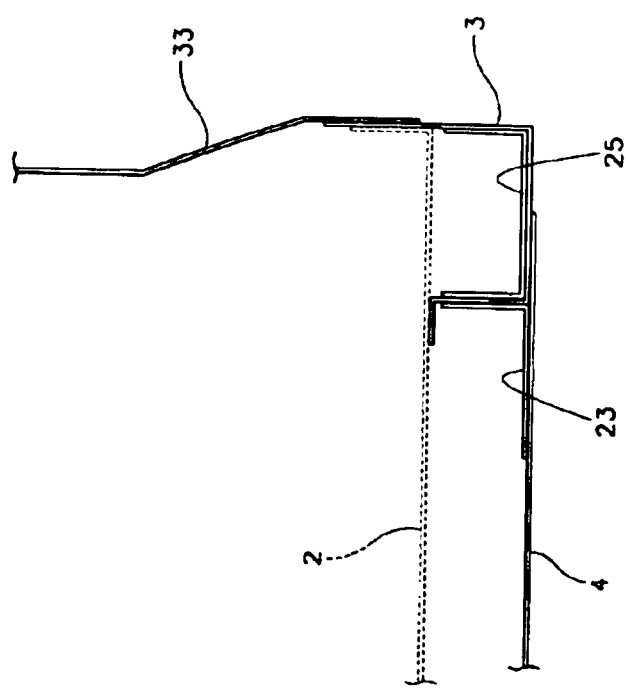
FIG. 4 is a cross-sectional view taken along line IV—IV of FIG. 3.

As shown in FIGS. 1 to 4, this embodiment of the present invention further comprises a rear support bracket 21 welded between the rear floor panel 2 that forms the spare-tire compartment 1 and the rear floor cross member 4 that connects the spare-tire compartment 1 and the rear floor cross member 4. A cross member bracket 23 is equipped by being welded at the coupling part of the rear floor cross member 4 and the rear floor side member 3 to increase the rigidity of the coupling part therein. A pair of side member brackets 25, which are disposed to face each other, are inserted by being welded inside the rear floor side member 3 near the part where the rear floor cross member 4 couples with the rear floor side member 3. In FIGS. 3 and 4, a rear wheel housing inner panel is welded onto the rear floor side member 3.

The rear support bracket 21, as shown in FIGS. 1 and 2, is composed of a first side flange 21a that connects with the outer bottom side 1a of the spare-tire compartment 1 by being welded together. A pair of second side flanges 21b connect with the outer side 1b of the spare-tire compartment 1 by being welded together. A third side flange 21c connects with the outer bottom side 4a of the rear floor cross member 4 by being welded together. A side body 21d connects the side flanges 21a, 21b, and 21c.

A polygonal-shaped sealed area C is formed between the rear floor panel 2, rear floor cross member 4, and rear support bracket 21 near the spare-tire compartment 1.

The cross member bracket 23, as shown in FIGS. 3 and 4, is composed of a first coupling side 23a that connects with the inner bottom side 4b of the rear floor cross member 4 by being welded together. A second coupling side 23b extends from the first coupling side 23a and connects with the inner lateral side 4c of the rear floor cross member 4 by being welded together. A third coupling side 23c extends from the first and second coupling sides 23a, 23b and connects with the outer lateral side 3a of the rear floor side member 3 by being welded together.

The side member bracket 25, as shown in FIGS. 3 and 4, is composed of a first welding side 25a that connects with the inner bottom side 3b of the rear floor side member 3 by being welded together. A second welding side 25b extends from the first welding side 25a and connects with the inner lateral side 3c of the rear floor side member 3 by being welded together. A welding side body 25c connects the first and second welding sides 25a and 25b.

When a rear collision takes place, the force from the rear impact is transmitted toward the front of the vehicle via the rear floor part.

The rear impact toward the front of the vehicle acts as a collapsing force to the spare-tire compartment 1.

Once the rear support bracket 21 is installed between the spare-tire compartment 1 and the rear floor cross member 4 according to the embodiment of the present invention, the spare-tire compartment 1 collapses when a rear collision occurs. However, the rear floor part, including the spare-tire compartment 1, limits the thrust exerted toward the front of the vehicle by a supporting force from the rear support bracket 21.

Further, if there is a cross member bracket 23 is installed at a coupling part of the rear floor cross member 4 and the rear floor side member 3 and a pair of side member brackets 25 installed inside the rear floor side member 3 near the part where the rear floor cross member 4 couples with the rear floor side member 3, the supporting force, in relation to the direction of the impact, increases significantly to limit torsional deformation of the rear floor cross member 4.

Provided that the supporting force in relation to the impact is increased by the cross member bracket 23 and side member bracket 25, and that the torsional deformation of the cross member 4 has been limited to the fullest extent, damage to the fuel tank is prevented, and the safety of the rear seat passengers is effectively obtained.

As apparent from the foregoing, the present invention provides an advantage in that the rigidity of the rear floor part is strengthened, thereby limiting the amount of thrust placed on the rear floor part toward the front of the vehicle is greatly limited in the event of a rear collision, preventing damage to the fuel tank, and protecting the safety of rear seat passengers.

The foregoing description of the preferred embodiment of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto and their equivalents.

What is claimed is:

1. A rear floor part structure for a vehicle, comprising:
    a rear support bracket disposed between a rear floor panel part forming a spare-tire compartment and a rear floor cross member for connecting said spare-tire compartment and said rear floor cross member, the rear support bracket comprising:
        a first side flange connecting with an outer bottom side of said spare-tire compartment by welding;
        a pair of second side flanges connecting with an outer side of said spare-tire compartment by welding;
        a third side flange connecting with an outer bottom side of said rear floor cross member by welding; and
        a side body connecting said first, second and third side flanges;
    a cross member bracket configured to be mounted at a coupling part of said rear floor cross member and a rear floor side member for increasing the rigidity of said coupling part; and
    a pair of side member brackets disposed to face each other and inserted by being welded inside said rear floor side member near the coupling part where said rear floor cross member couples with said rear floor side member.

2. The structure as defined in claim 1, wherein a polygonal-shaped sealed area is formed between said rear floor panel, said rear floor cross member, and said rear support bracket in close proximity of said spare-tire compartment.

3. The structure as defined in claim 1, wherein said cross member bracket comprises:
    a first coupling side connecting with an inner bottom side of said rear floor cross member;
    a second coupling side extending from said first coupling side for connecting with an inner lateral side of said rear floor cross member; and
    a third coupling side extending from said first and second coupling sides for connecting with an outer lateral side of said rear floor side member.

4. The structure was defined in claim 1, wherein said side member bracket comprises:
    a first welding side connecting with an inner bottom side of said rear floor side member by welding;
    a second welding side extending from said first welding side and connecting with an inner lateral side body connecting said first welding side and said rear floor side member; and
    a welding side body connecting said first welding side and said second welding side.

* * * * *